May 8, 1934.  L. L. GRAHAM  1,958,390
AUTOMOBILE BRAKE TESTING DEVICE
Filed Oct. 16, 1930  4 Sheets-Sheet 1
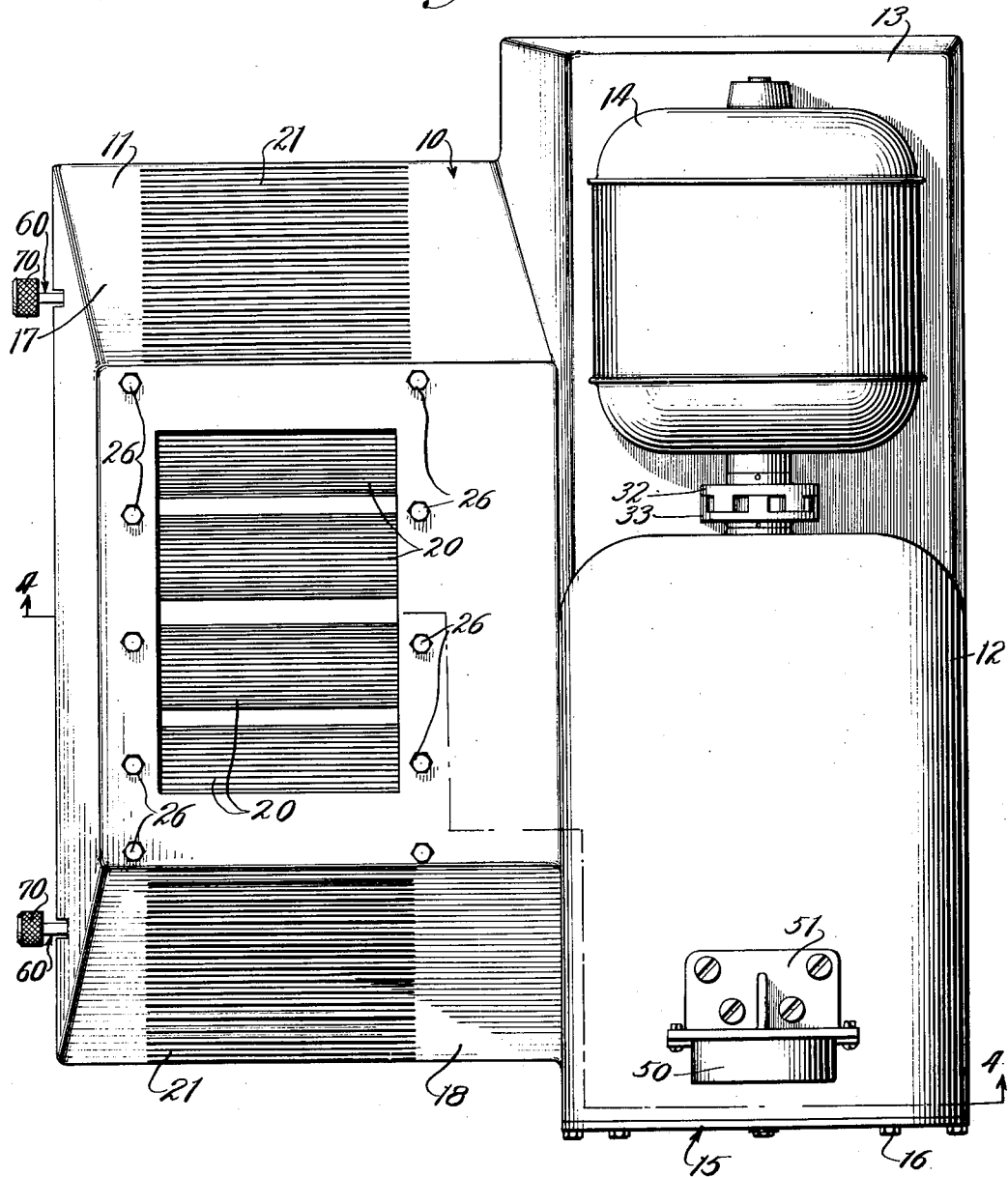

May 8, 1934.  L. L. GRAHAM  1,958,390
AUTOMOBILE BRAKE TESTING DEVICE
Filed Oct. 16, 1930    4 Sheets-Sheet 2
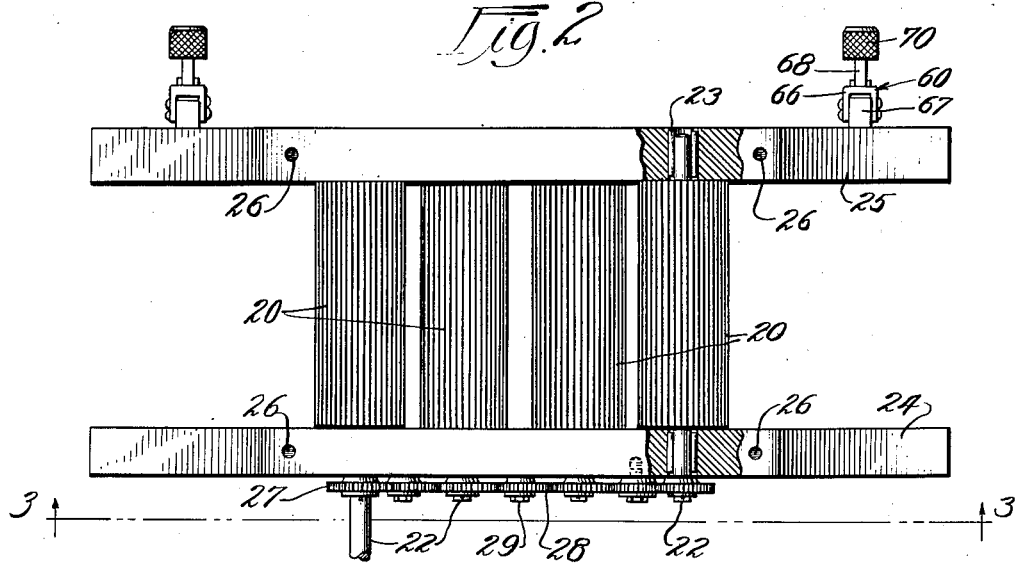
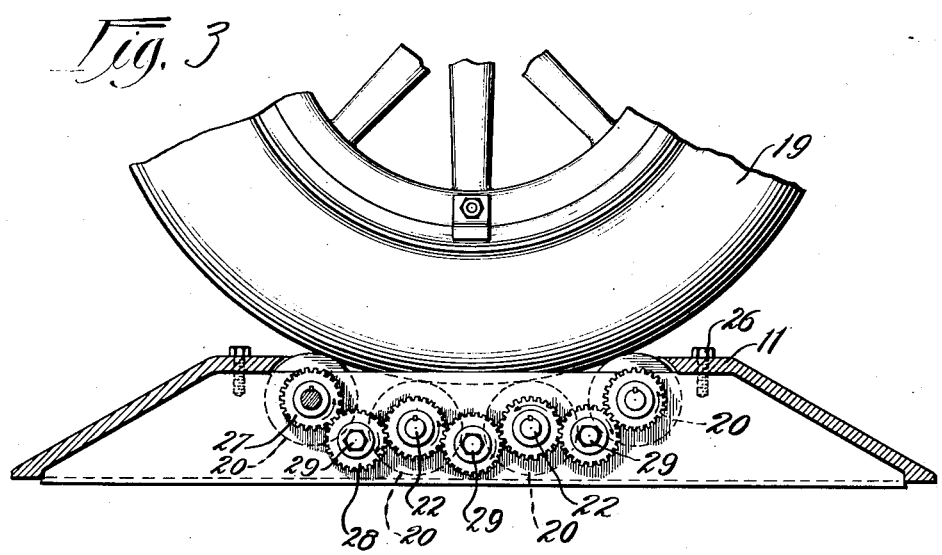
Inventor:
Leon L. Graham
By Carl S. Lloyd
Attorney.

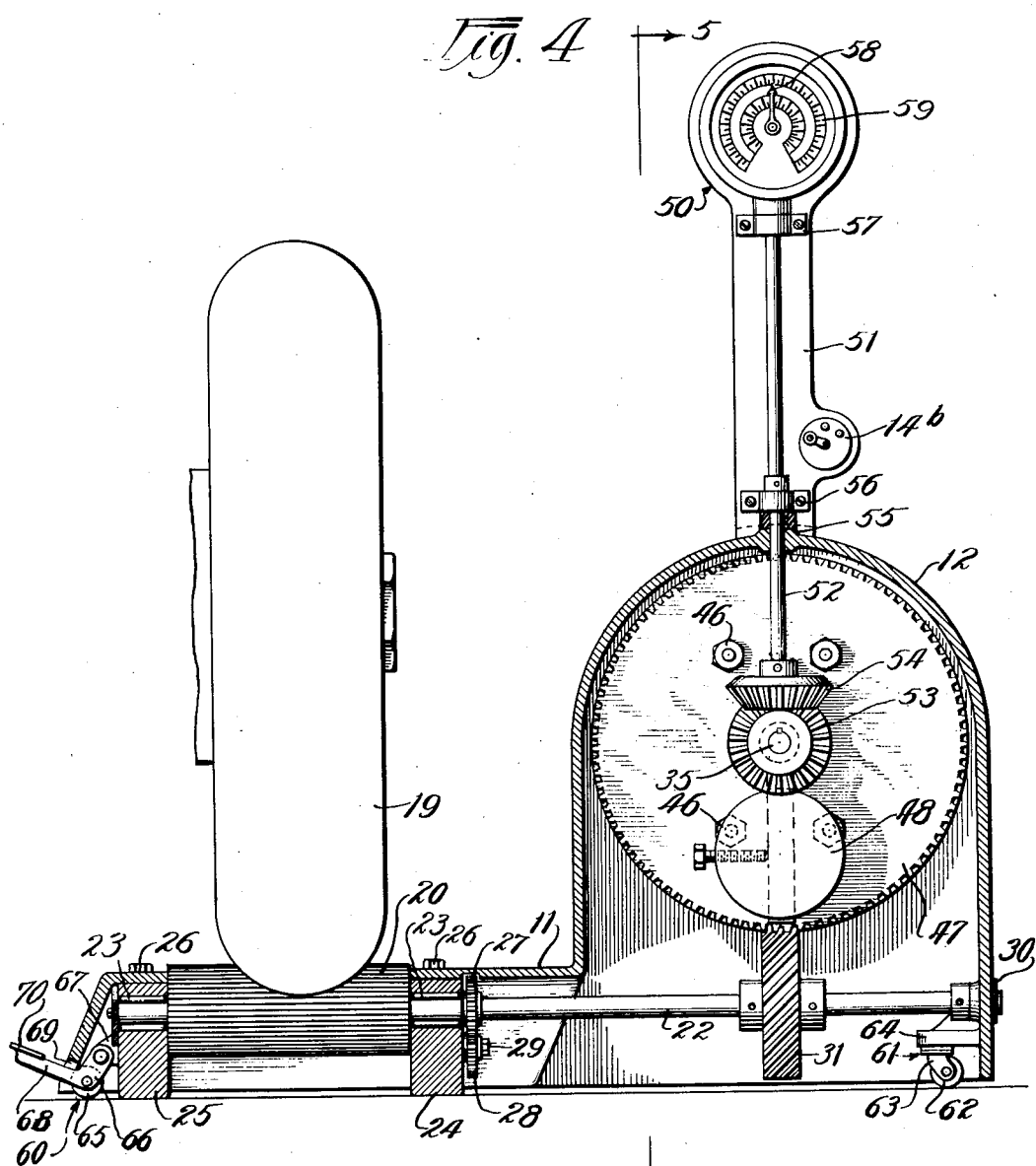

May 8, 1934.  L. L. GRAHAM  1,958,390
AUTOMOBILE BRAKE TESTING DEVICE
Filed Oct. 16, 1930  4 Sheets-Sheet 4

Inventor:
Leon L. Graham

Patented May 8, 1934

1,958,390

UNITED STATES PATENT OFFICE 1,958,390

AUTOMOBILE BRAKE TESTING DEVICE

Leon L. Graham, Chicago, Ill., assignor to Bendix-Cowdrey Brake Tester, Inc., Dover, Del., a corporation of Delaware Application October 16, 1930, Serial No. 489,017

2 Claims. (Cl. 265—25)

This invention relates to brake-testing devices particularly designed for use in the testing of automobile brakes.

An object of the invention is to provide a device of this character in the form of a compact unit which may be readily moved from place to place and positioned for testing the brakes of any one of the wheels of the car.

Another object of the invention is to provide in a device of this character an arrangement of wheel rotating drums or rollers which will assure positive frictional engagement between the drums and the peripheral face of the automobile wheel.

Further objects and advantages of the invention will be apparent as I proceed with my specification, which, taken in connection with the accompanying drawings, discloses a preferred embodiment thereof.

Referring to the drawings:

Fig. 1 is a top plan view of the testing device;

Fig. 2 is a top plan view, partly in section, showing the wheel rotating drums;

Fig. 3 is a section taken on the line 3—3 of Fig. 2;

Fig. 4 is a section taken substantially on the line 4—4 of F.g. 1, and showing an automobile wheel positioned on the device for testing.

Figure 5:
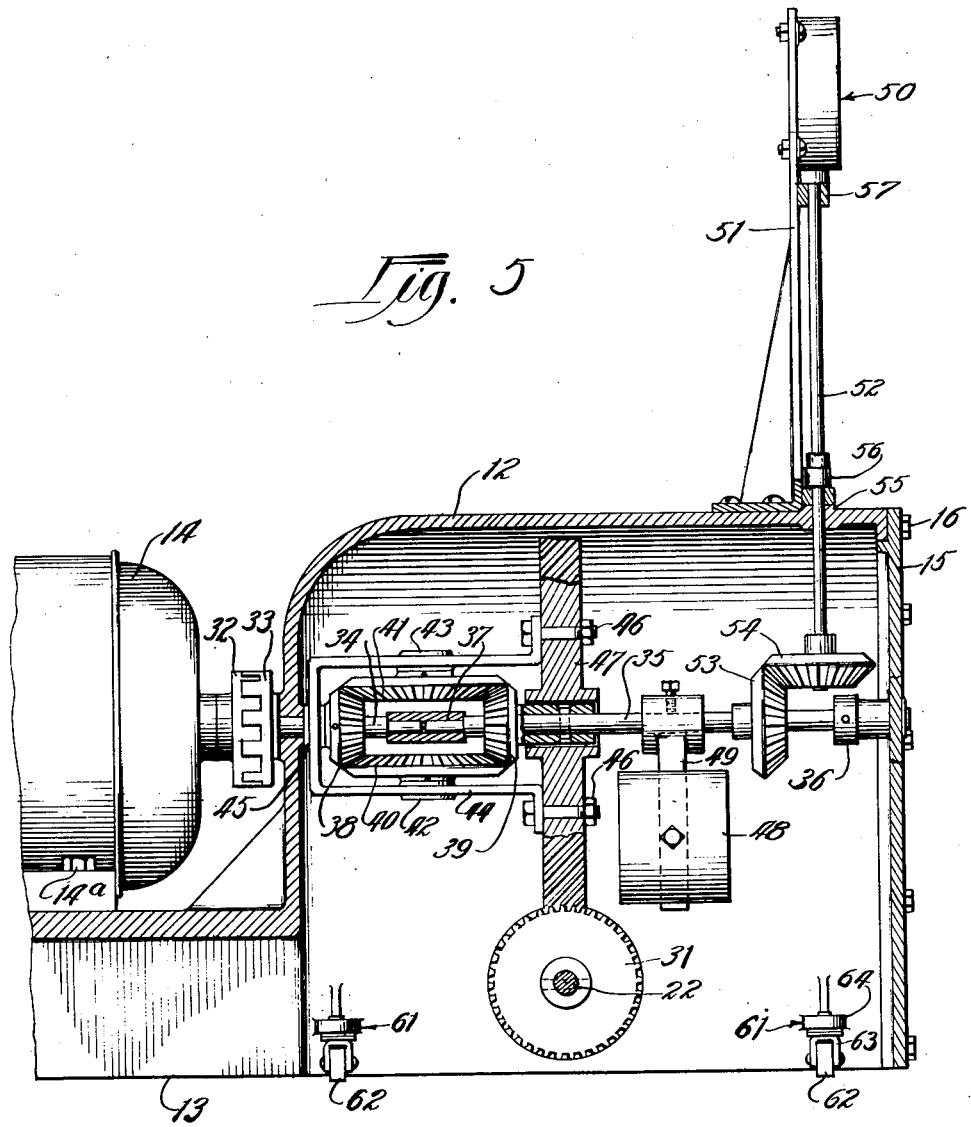
Fig. 5 is a section taken substantially on the line 5—5 of Fig. 4.

The major portion of the operative mechanism of the device is contained within a housing 10 which includes a tread portion 11, over which a wheel of the car may pass, and a gear housing portion 12 in which are contained the power-transmitting gears and the differential gears which actuate the measuring mechanism. The housing 10 includes, in addition, a base portion 13 which serves as a support for a motor 14, said motor being secured to the base by bolts 14ª (Fig. 5). The entire housing 10 may be formed as a single casting except for the end plate 15 which is removably secured to the gear housing 12 by bolts 16. The tread portion 11 of the housing is tapered to afford inclined faces 17 and 18 by which an automobile wheel 19 may be easily raised to bring the wheel into engagement with wheel-rotating drums 20. The inclined faces 17 and 18 may be corrugated as indicated at 21 to prevent slipping of the tire thereon when the wheel is being raised into testing position.

Referring to Figs. 2 and 4, the wheel rotating drums 20 are four in number and are mounted on shafts 22 which are journaled at their opposite ends in bearings 23, said bearings being formed in bearing supporting members 24 and 25 which extend longitudinally of the wheel supporting portion 11 of the housing 10, said members being secured to the housing by bolts 26. Referring to Fig. 3, the two innermost of the drums 20 are positioned somewhat below the two outer drums so as to provide a driving surface conforming to the peripheral surface of the automobile tire. In the illustration shown, all of the drums are of the same diameter and are spaced substantially equal distances apart. It will be apparent that a similar effect could be obtained by positioning the axes of the drums in the same plane but making the diameter of the outer drums somewhat larger so as to conform to the peripheral outline of the tire. By mounting a plurality of drums in this manner a positive frictional engagement with the tire of the wheel is assured. Ordinarily four drums will suffice to give a satisfactory driving engagement. However, more may be provided if desired.

The drums 20 are interconnected by gear wheels 27, carried on the inner ends of the shafts 22, and gear wheels 28 carried on stub shafts 29 anchored on the drum supporting member 24, said gear wheels 28 being interposed between adjacent pairs of the gear wheels 27. The drums are driven from the rearmost drum shaft 22 which extends through the gear housing 12, the end of the shaft being journaled in a bearing 30 (Fig. 4) mounted in the far wall of the gear housing 12. A gear 31 is carried on this shaft, said gear having operative connection with the motor 14 through the gear train now to be described.

Referring to Fig. 5, the armature shaft of the motor 14 carries a clutch member 32 which engages a clutch member 33 which is mounted on a stub shaft 34, said stub shaft being journaled in the forward wall of the gear housing 12. A shaft 35 is journaled at one end in a bearing 36 carried by the removable end plate 15 and is held in alignment with the stub shaft 34 by a sleeve 37 which affords a supporting connection between the adjacent free ends of the shafts 34 and 35. The shafts 34 and 35 are connected by a differential which comprises bevelled pinions 38 and 39, carried by the shafts 34 and 35, respectively, and bevelled gear wheels 40 and 41, which are mounted for free rotation on stub shafts which are journaled at 42 and 43, respectively, in the opposite side walls of a housing 44. The housing 44 is secured at one end, as indicated at 45 to the hub of the pinion 38, the other end of said housing being secured by means of bolts 46 to a gear wheel 47, which has free rotation on the hub of the pinion 39. The gear wheel 47 meshes with the gear 31 which in turn drives the drums 20.

The measuring mechanism for determining the amount of the brake resistance comprises a weight 48 adjustably mounted on a weight support arm 49, carried by the shaft 35, and an indicating dial 50 which is supported on a bracket 51 carried by the gear housing 12, said dial being actuated by a shaft 52 which is driven from the shaft 35 through the bevelled pinions 53 and 54 carried by the shafts 35 and 52, respectively. The dial shaft 52 is supported near its lower end in a bearing 55 mounted in the top wall of the gear housing 12. A pair of bearings 56 and 57 carried by the supporting bracket 51 afford a support for the upper portion of the dial shaft 52. The dial includes an indicator hand 58 (Fig. 4) which plays over a scale 59 to indicate the amount of brake resistance. A motor starting switch 14$^b$ is mounted on the dial supporting bracket 51.

Assuming that there is no resistance on the wheel-rotating drums 20, the transmission of power from the motor 14 will be through the pinion 38 and the housing 44 to the gear wheel 47, which turns the gear 31 to rotate the drums 20. The shaft 35, which actuates the measuring mechanism, does not turn inasmuch as the path of least resistance through the differential is through the housing 44 and the gear wheel 47, the weight 48 being sufficient to hold the pinion 39 stationary. When, however, resistance is offered to the rotation of the drums 20 by reason of the application of a braking force to the automobile wheel 19, the resistance thereby afforded is transmitted through the gear train 31 and 47 to the differential housing 44, and if the retarding effect is appreciable the rotational movement of the pinion 38 instead of being transmitted entirely to the drums 20 will be divided proportionately, according to the ordinary principle of operation of a differential, between the differential housing 44 and the pinion 39. If the braking resistance on the drums 20 is sufficient to be of measurable magnitude, the weight 48 would be raised a distance proportionate to the braking resistance applied, and the measuring dial 50 will give a reading corresponding to the braking force applied to the automobile wheel 19.

The testing device is designed in the form of a compact portable unit which may easily be moved from one wheel of the car to the other to permit equalizing tests. To this end I provide a pair of adjustable casters 60 secured to the bearing support member 25, and a pair of fixed casters 61 secured to the inner wall of the gear housing 12. The fixed casters 61 include rollers 62 carried in bifurcated brackets 63, which are in turn pivotally secured to caster supporting arms 64 carried by the gear housing wall. The rollers 62 extend slightly below the lower edge of the gear housing so as to keep that portion of the housing raised slightly from the floor level. The adjustable casters 60 comprise rollers 65 supported in bifurcated brackets 66, which are in turn pivotally secured to caster supporting arms 67 carried by the bearing support 25. The brackets 66 include arms 68 which project through notches 69 formed in the wheel supporting housing 11, said arms being provided on their outer free ends with foot treadles 70. In the position shown in Fig. 4, the adjustable casters 65 have been raised to allow the bearing supports 24 and 25 to rest on the floor. In this position under the weight of the car, the frictional engagement of the bearing supports 24 and 25 on the floor is sufficient to prevent movement of the testing device. After the car is removed, the operator raises the wheel supporting housing 11 by stepping on the treadles 70 which swings the rollers 65 downwardly sufficiently to raise the bearing supports 24 and 25 from the floor. The entire device may then be readily rolled into position for testing another wheel. It will be understood, also, that the device just described might be duplicated, or provision otherwise made, for testing the brakes on two or more wheels of the car at the same time.

The foregoing detailed description has been given for clearness of understanding only, and no unnecessary limitations should be understood therefrom, but the appended claims should be construed as broadly as permissible in view of the prior art.

What I regard as new and desire to secure by Letters Patent is:

1. A brake testing machine comprising a wheel supporting and rotating means including a base, a group of at least three drive rollers closely positioned thereon for rotation, the axis of each of said rollers being parallel with each other, the peripheries of each of said rollers being tangent to an arc of the same radius as a wheel to be tested, and means for driving each of said rollers in the same direction and with equal peripheral velocities, said driving means being independent of any wheel supported on said rollers, and said rollers being relatively small compared to the arc to which the peripheries of said rollers are tangent to, whereby, a plurality of rollers may not include an arc which at any point is greatly spaced from a chord subtended thereby.

2. A brake testing machine comprising a wheel supporting and rotating means including a base, a ramp at each end thereof, a group of at least three drive rollers closely positioned on the base for rotation between the ramps, the axis of each of said rollers being parallel with each other, the peripheries of each of said rollers being tangent to an arc of the same radius as a wheel to be tested, means for driving each of said rollers in the same direction and with equal peripheral velocities, said driving means being independent of any wheel supported on said rollers, and said rollers being relatively small compared to the arc to which the peripheries of said rollers are tangent to, whereby, a plurality of rollers may not include an arc which at any point is greatly spaced from a chord subtended thereby.

LEON L. GRAHAM.